(12) United States Patent
Cobb et al.

(10) Patent No.: US 10,323,486 B2
(45) Date of Patent: Jun. 18, 2019

(54) DOWNHOLE ENERGY STORAGE AND CONVERSION

(71) Applicant: Halliburton Energy Services, Inc., Houston, TX (US)

(72) Inventors: James Cobb, Cypress, TX (US); Paul Rodney, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 888 days.

(21) Appl. No.: 14/781,982

(22) PCT Filed: May 3, 2013

(86) PCT No.: PCT/US2013/039559
§ 371 (c)(1),
(2) Date: Oct. 2, 2015

(87) PCT Pub. No.: WO2014/178886
PCT Pub. Date: Nov. 6, 2014

(65) Prior Publication Data
US 2016/0084043 A1    Mar. 24, 2016

(51) Int. Cl.
*E21B 41/00* (2006.01)
*H02K 7/18* (2006.01)

(52) U.S. Cl.
CPC ....... *E21B 41/0085* (2013.01); *H02K 7/1853* (2013.01)

(58) Field of Classification Search
CPC .................................................. E21B 41/0085
See application file for complete search history.

(56) References Cited

U.S. PATENT DOCUMENTS

| 3,666,030 | A |   | 5/1972  | Bohn et al. |
|-----------|---|---|---------|-------------|
| 4,515,225 | A |   | 5/1985  | Dailey |
| 5,833,016 | A | * | 11/1998 | Carpenter ................. B66B 9/00 175/85 |
| 5,839,508 | A | * | 11/1998 | Tubel .................. E21B 41/0085 166/65.1 |
| 7,201,239 | B1|   | 4/2007  | Perry |

(Continued)

FOREIGN PATENT DOCUMENTS

| CN | 1628207 A | 6/2005 |
|----|-----------|--------|
| EP | 2445080 A1 | 4/2012 |

(Continued)

OTHER PUBLICATIONS

Office Action issued in related Chinese Application No. 2013800749964, dated Dec. 2, 2016 (17 pages).

(Continued)

*Primary Examiner* — Giovanna C Wright
*Assistant Examiner* — Tara E Schimpf
(74) *Attorney, Agent, or Firm* — Jason Sedano; Baker Botts L.L.P.

(57) ABSTRACT

Energy may be stored, converted, and generated during a drilling operation. An example method includes receiving fluid energy from a flow of drilling fluid (115) in a borehole (105). The received fluid energy may be stored as mechanical energy in an energy storage device (205) in the borehole (105). Additionally, electrical energy may be generated from the mechanical energy using a generator mechanically or magnetically coupled to the energy storage device.

14 Claims, 4 Drawing Sheets

(56) References Cited

U.S. PATENT DOCUMENTS

| | | | |
|---|---|---|---|
| 7,242,103 B2 | 7/2007 | Tips | |
| 2006/0191681 A1 | 8/2006 | Storm et al. | |
| 2008/0217024 A1 | 9/2008 | Moore | |
| 2011/0240299 A1 | 10/2011 | Vick, Jr. et al. | |
| 2012/0067567 A1 | 3/2012 | Rytlewski et al. | |
| 2012/0297933 A1* | 11/2012 | Lavalley | E02F 3/965 81/57.34 |

FOREIGN PATENT DOCUMENTS

| | | |
|---|---|---|
| GB | 2058171 A | 4/1981 |
| GB | 2467046 A | 7/2010 |
| RU | 2324815 C1 | 5/2008 |
| WO | 1986/005543 A1 | 9/1986 |
| WO | 1996/012106 A1 | 4/1996 |
| WO | 01/55551 A1 | 8/2001 |
| WO | 2006/060673 A1 | 6/2006 |
| WO | 2006/065559 A1 | 6/2006 |

OTHER PUBLICATIONS

International Preliminary Report on Patentability issued in related PCT Application No. PCT/US2013/039559 dated Nov. 12, 2015 (9 pages).

International Search Report and Written Opinion issued in related PCT Application No. PCT/US2013/039559 dated Dec. 13, 2013, 13 pages.

* cited by examiner

DOWNHOLE ENERGY STORAGE AND CONVERSION

CROSS-REFERENCE TO RELATED APPLICATION

The present application is a U.S. National Stage Application of International Application No. PCT/US2013/039559 filed May 3, 2013, which is incorporated herein by reference in its entirety for all purposes.

BACKGROUND

The present disclosure relates generally to well drilling operations and, more particularly, to downhole energy storage and conversion.

Power is often required downhole for a number of applications, including well logging and telemetry. Storing the necessary power downhole, however, can sometimes be difficult. For example, power storage in certain regions of a wellbore is limited due to high temperatures and other harsh conditions, which may be outside the operational limits of conventional batteries and capacitors. Likewise, generating the necessary power downhole can sometimes be problematic. For example, a typical approach to generating power downhole utilizes the circulation of drilling mud to operate a generator or turbine. This approach is limited, however, because it does not generate the necessary power when the mudflow stops and power is still needed.

FIGURES

Some specific exemplary embodiments of the disclosure may be understood by referring, in part, to the following description and the accompanying drawings.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure relates generally to well drilling operations and, more particularly, to downhole energy storage and conversion.

Illustrative embodiments of the present disclosure are described in detail herein. In the interest of clarity, not all features of an actual implementation may be described in this specification. It will of course be appreciated that in the development of any such actual embodiment, numerous implementation-specific decisions must be made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present disclosure, the following examples of certain embodiments are given. In no way should the following examples be read to limit, or define, the scope of the disclosure. Embodiments of the present disclosure may be applicable to horizontal, vertical, deviated, multilateral, u-tube connection, intersection, bypass (drill around a mid-depth stuck fish and back into the well below), or otherwise nonlinear wellbores in any type of subterranean formation. Embodiments may be applicable to injection wells and production wells, including natural resource production wells such as hydrogen sulfide, hydrocarbons or geothermal wells; as well as borehole construction for river crossing tunneling and other such tunneling boreholes for near surface construction purposes or borehole u-tube pipelines used for the transportation of fluids such as hydrocarbons. Embodiments described below with respect to one implementation are not intended to be limiting.

Modern petroleum drilling and production operations demand information relating to parameters and conditions downhole. Several methods exist for downhole information collection, including logging-while-drilling ("LWD") and measurement-while-drilling ("MWD"). In LWD, data is typically collected during the drilling process, thereby avoiding any need to remove the drilling assembly to insert a wireline logging tool. LWD consequently allows the driller to make accurate real-time modifications or corrections to optimize performance while minimizing down time. MWD is the term for measuring conditions downhole concerning the movement and location of the drilling assembly while the drilling continues. LWD concentrates more on formation parameter measurement. While distinctions between MWD and LWD may exist, the terms MWD and LWD often are used interchangeably. For the purposes of this disclosure, the term LWD will be used with the understanding that this term encompasses both the collection of formation parameters and the collection of information relating to the movement and position of the drilling assembly.

Figure 1:
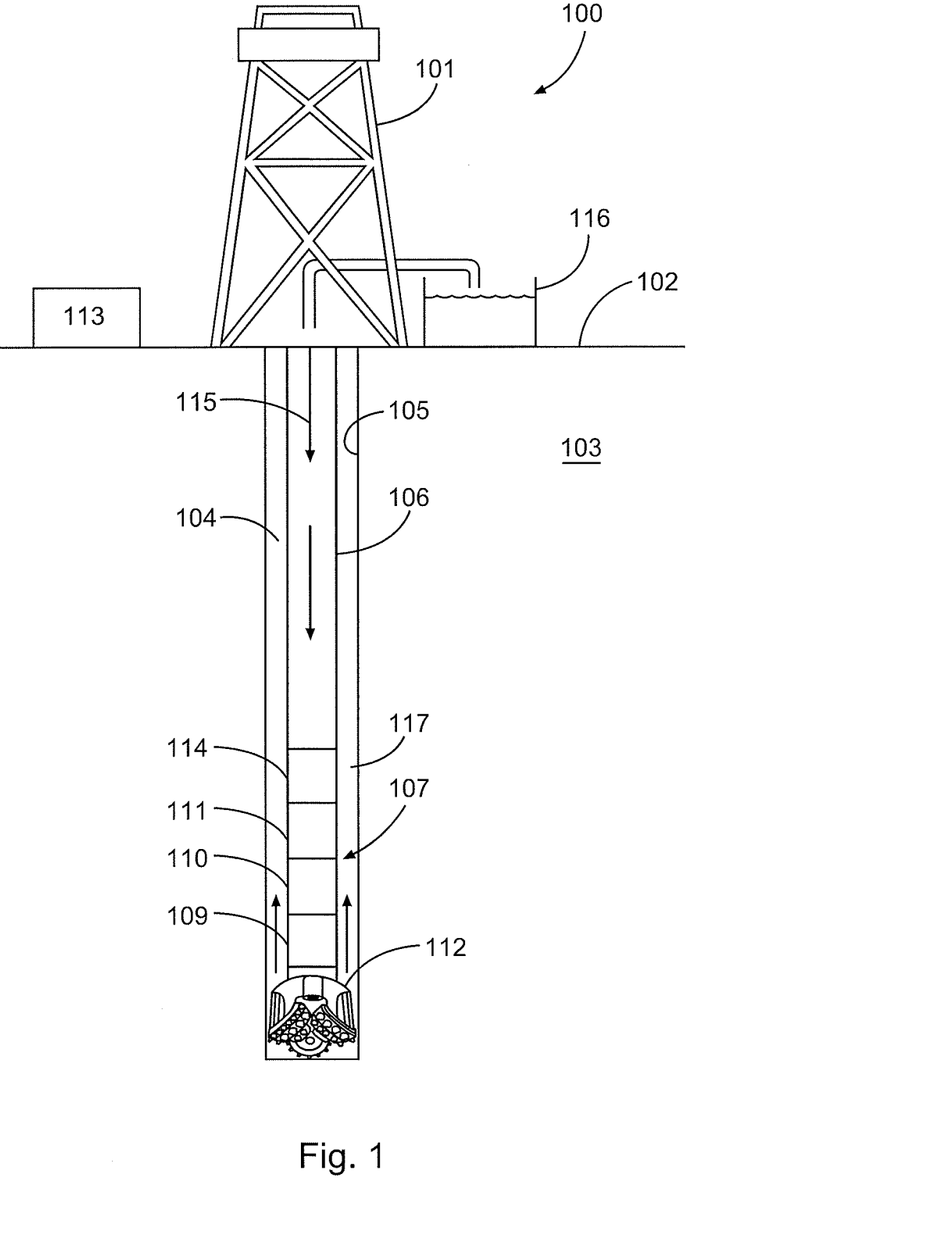
FIG. 1 is a diagram illustrating an example drilling system, according to aspects of the present disclosure.

FIG. 1 is a diagram illustrating an example drilling system 100, according to aspects of the present disclosure. The drilling system 100 comprises a rig 101 positioned at the surface 102, above a formation 103. Although the rig 101 is shown on land in FIG. 1, the rig 101 may be used at sea, with the surface 102 comprising a drilling platform. The rig 101 may be coupled to a drilling assembly 104 that is drilling a borehole 105 within the formation 103. The drilling assembly 104 may comprise a drill string 106 and a bottom hole assembly (BHA) 107. The BHA 107 may comprise one or more LWD or MWD systems 109 and 110. The LWD/MWD systems 109 and 110 may comprise downhole instruments. The BHA 107 may further include a downhole telemetry system 111, a power system 114, and a drill bit 112. During drilling operations, drilling mud 115 may be pumped into the drill string 106 from a surface reservoir 116. The drilling mud 115 may flow through the drill string 106 and exit from the drill bit 112, lubricating and cooling the cutting face of the drill bit 112 and carrying cuttings from the drill bit 112 to the surface 102. The drilling mud 115 may return to the surface 102 through an annulus 117 between the drilling assembly 104 and the wall of the borehole 105.

The telemetry system 111 may communicate via mud pulses, wired communications, or wireless communications with a surface control unit 113. The surface control unit 113 may transmit commands to elements of the BHA using mud pulses or other communication media that are received at the telemetry system 111. Likewise, the telemetry system 111 may transmit information to the surface control unit 113 from elements in the BHA such as the LWD/MWD systems 109 and 110. For example, the LWD/MWD system 109 and 110 may take a variety of measurements of formation 103 and borehole 105 in response to commands from the control unit 113, and may transmit those measurements to the surface control unit 113 through the telemetry system 111.

Power system 114 may provide power to elements of the BHA 107 that require power to operate, including LWD/MWD systems 109 and 110 and telemetry system 111. In certain embodiments, other systems may be incorporated into the BHA 107 and powered by the power system 114, including ranging systems and steering assemblies. The telemetry system 111 may require power to communicate with the surface control unit 113 and to forward commands within the BHA 107. Likewise, the LWD/MWD systems 109 and 110 may require power to transmit electromagnetic or acoustic signals into the formation 103, to receive and measure the resulting electromagnetic field or acoustic signal, and to store or transmit those measurements to the surface control unit 113 through the telemetry system 111.

Typical drilling assemblies may generate power while the drilling mud 115 is flowing, but may not be equipped to generate power when the drilling fluid has stopped. This may prevent some measurement operations using the LWD/MWD systems 109 and 110 from occurring when the drilling mud 115 is not flowing. Likewise, downhole batteries may not provide the necessary power because downhole temperature and pressure conditions may exceed the operating ranges of typical batters. In embodiments of the present disclosure, energy is stored mechanically downhole using mechanisms that are more tolerant to downhole pressure and temperature conditions. The mechanical energy may be converted to electrical energy when needed to power elements of the BHA 107.

Figure 2:
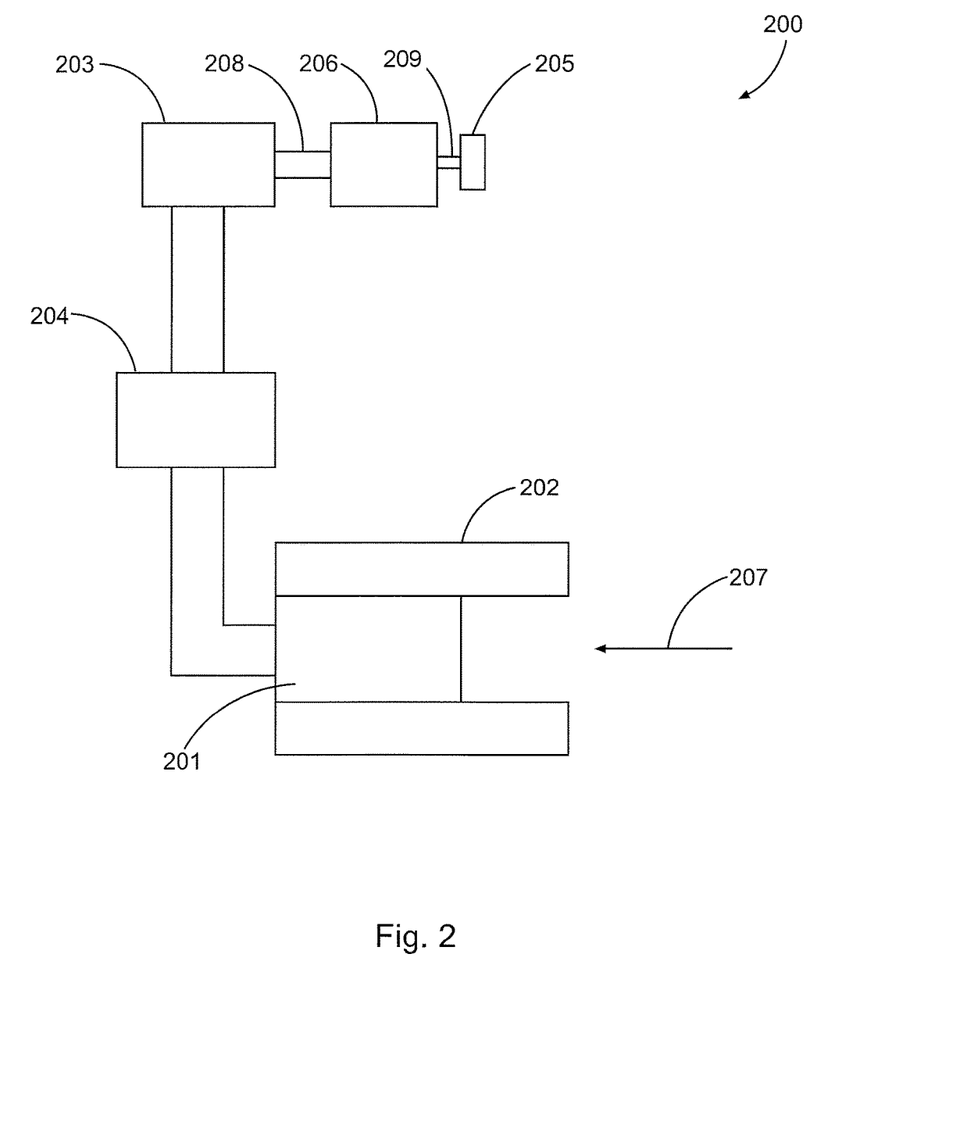
FIG. 2 is a diagram illustrating an example power storage and conversion assembly, according to aspects of the present disclosure.

FIG. 2 is a diagram illustrating an example power storage and conversion assembly 200, according to aspects of the present disclosure. In certain embodiments, the assembly 200 may be incorporated into a power system within a BHA, similar to power system 114 in BHA 107 from FIG. 1. The assembly 200 may comprise a power source that derives power from an active drilling operation. The power source may comprise, for example, a fluid-driven power source or a vibration-driven power source, as will be described below. In the embodiment shown, the power source may comprise a fluid-driven power source that extracts energy from a flow of drilling fluid within a drilling assembly. The fluid-driven power source may comprise an alternator 201 positioned in a drill collar 202 that is coupled to a device (not shown) that extracts rotary motion from a flow of drilling fluid within the drill collar 202, such as a turbine, and causes a rotor within the alternator 201 to rotate. The assembly 200 may further comprise a reversible electric motor 203 coupled to the fluid-driven power source via regulator 204 positioned between the reversible electric motor 203 and the alternator 201. The reversible electric motor 203 may be further coupled to an energy storage device 205 through a gear box 206. As will be described below, the reversible electric motor 203 may comprise a first mode in which it transmits energy from the fluid-driven power source to the energy storage device 205 and a second mode in which it generates electricity using energy from the energy storage device 205.

Fluid energy from the flow of drilling mud 207 may be received at the fluid-driven power source. In the embodiment shown, the received fluid energy may cause a rotor within alternator 201 to rotate and generate electricity that is then transmitted through the regulator 204 to the reversible electric motor 203. The electricity may cause an output shaft 208 of the reversible electric motor 203 to rotate in a first direction, thus converting the electricity from the fluid-driven power source into mechanical energy. The output shaft 208 may be connected to gear box 206, and the rotation of the output shaft 208 may be transmitted through the gear box 206 to the energy storage device 206, where the mechanical energy can be stored. In the embodiment shown, the storage mechanism 205 may comprise a spring that may be energized by elastic deformation. For example, the spring may be energized by winding, compressing, or elongating the spring with respect to a relaxed state of the spring. Energizing the spring stores energy as mechanical energy (potential energy) that may be released when allowing the spring to return to the relaxed state. Thus, a spring that is connected to the gear box 206 via a secondary shaft 209 may be capable of winding, compression, or elongation. A windable example of the spring 205 may be similar to a clock spring that is wound by the reversible electric motor 203 directly or indirectly through the gear box 206. In certain embodiments, a torque or force limiting device such as a torque limiting clutch or force limiting counter-spring can be used to prevent over-compression of the spring 205.

When the flow of drilling mud 207 stops, the energy stored within spring 205 may be released. For example, the spring 205 may unwind causing the secondary shaft 209 to rotate in the opposite direction than when the drilling mud 207 was flowing. The gear box 206 may impart the rotation of the secondary shaft 209 to the output shaft 208 of the reversible electric motor 203. The output shaft 208 may rotate the rotor within the reversible electric motor 203, causing the reversible electric motor 203 to generate electricity. Accordingly, the mechanical energy stored within the spring 205 may be converted to electrical energy by the reversible electric motor 203. The reversible electric motor 203 can therefore supply electricity for power consumption and/or short-term energy storage when drilling mud 207 is not flowing. In certain embodiments, switching logic can be used to control the operation of the alternator 201 and motor 203 for various conditions, e.g., immediately after flow stops, or at times when the torque limiting device is preventing further energy from being stored in the spring.

Figure 3:
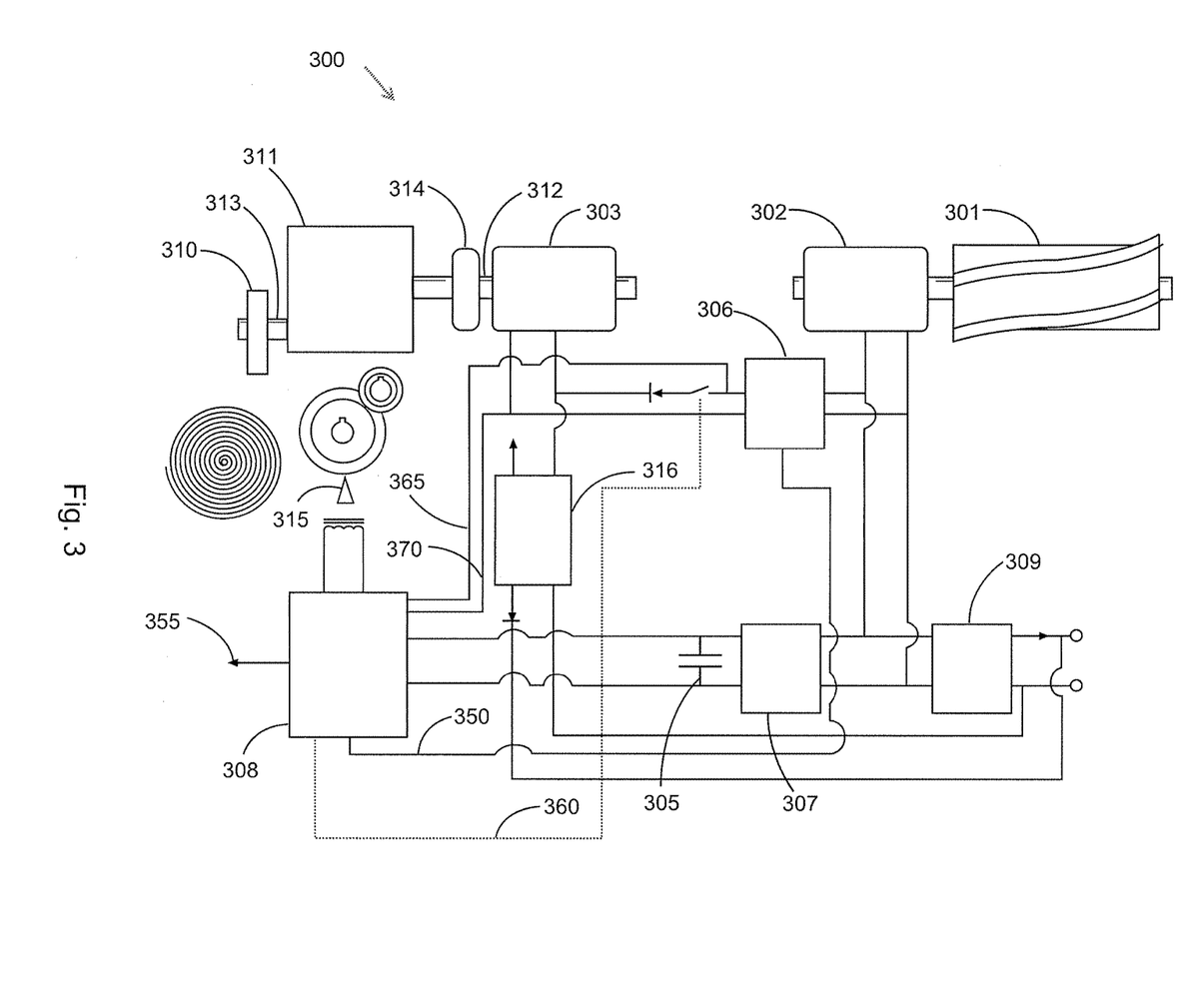
FIG. 3 is a diagram illustrating an example power storage and conversion assembly, according to aspects of the present disclosure.

FIG. 3 is a diagram illustrating an example power storage and conversion assembly 300, according to aspects of the present disclosure. The assembly 300 may include a downhole power source that derives power from an active drilling operation. In the embodiment shown, the power source is a fluid-driven power source that comprises turbine 301 coupled to an alternator 302. The assembly 300, including the turbine 301, may be disposed within a drill collar of a drilling assembly. The rotary motion of the turbine 301 in response to a flow of drilling mud may cause the alternator 302 to generate electrical energy. Although the power source in FIG. 3 comprises a fluid-driven power source with a turbine 301 and alternator 302, other power sources could be used, including a vibration-driven power source that derives power from vibration of a drilling assembly during a drilling operation. Example vibration-driven power sources may comprise magnetostrictive or piezoelectric generators that generate electricity in response to stress induced either by vibrations from the drilling operation or by a mechanism in the flow of drilling fluid designed to produce vibration.

One or more power regulators may be coupled to and derive power from the alternator 302. The embodiment shown comprises three power regulators 306, 307, and 309 that may be combined into one or two power regulators. A first power regulator 306 may be disposed electrically between the alternator 302 and a reversible electric motor 303, and may drive the reversible electric motor 303. A second power regulator 307 may be coupled and provide power to control electronics 308 associated with the reversible electric motor 303. The control electronics 308 may comprise at least one processor and at least one memory device coupled to the processor that contains a set of instructions that when executed cause the processor to perform certain actions. For example, the control electronics 308 may be used to prevent an overload of the reversible electric motor 303 when an energy storage device 310 coupled directly or indirectly to the reversible electric motor 303 has reached its maximum capacity, such as a spring that is wound to its maximum tension. A third power regulator 309 may be connected to the alternator 302 and used to provide power to systems, such as LWD/MWD systems and telemetry systems, during normal operations when fluid is flowing.

In certain embodiments, a capacitor 305 may be coupled to the regulator 307 to drive the control electronics 308 for a period of time after the alternator 302 stops generating electricity due to insufficient fluid flow across the turbine 301. The capacitor 305 may keep, for example, the reversible electric motor 303 from being immediately reversed when power from the alternator 302 ceases. The actual size of the capacitor 305 may depend on the control functions to be carried out and the delay required before the reversible electric motor 303 is reversed. Capacitor 305 may be on the order of 0.1-100 microfarad at 5 volts. In certain embodiments, capacitors may be coupled to other power regulators within the assembly.

The reversible electric motor 303 may be coupled to spring 310 through a gear box 311. For example, the reversible electric motor 303 may comprise a shaft 312 that is coupled to the gear box 311, and the gear box 311 may transmit rotational movement from the shaft 312 to the spring 310, which may be coupled to the gear box 311 through a secondary shaft 313. When drilling mud is flowing, the reversible electric motor 303 may drive shaft 312 in a first direction, and the gear box 311 may wind the spring 310 in the same direction through secondary shaft 313. When the drilling mud stops, or after some interval after the drilling mud stops, the spring 310 may unwind and drive the secondary shaft 313, and the rotation of the secondary shaft 313 may be transmitted to the shaft of the reversible electric motor 303 through the gear box 311. The reversible electric motor 303 then may generate electricity for certain downhole equipment, such as LWD/MWD systems. The generated electric power may be passed through a voltage regulator 316 coupled to the reversible electric motor 303.

In certain embodiments, a torque limiter and/or a clutch 314 may be coupled between the output shaft 312 of the reversible electric motor 303 and the gear box 311. The torque limiter/clutch 314 may prevent the reversible electric motor 303 from being loaded with sufficient torque to stall the motor 303 by either limiting the torque seen at the output shaft of the motor 303 or by disengaging the motor 303 from the spring 310 when the spring 310 has been wound to its maximum tension. Additionally, in certain embodiments, a brake 315 may be incorporated into the gear box 311. The brake 315 may be used to prevent the spring 310 from unwinding as soon as either the clutch 314 isolates the reversible electric motor 303 from the gear box 311, or power is removed from the reversible electric motor 303, e.g., when the flow of drilling fluid stops. An example brake 315 may comprise a pawl or similar device that engages against one of the gears in the gear box 311. The pawl may be triggered with a low power solenoid. Techniques for designing of torque limiters, gear boxes, and clutches would be appreciated by one of ordinary skill in the art in view of this disclosure.

Control electronics 308 may comprise different configurations depending on the amount of power needed and when that power is needed, and may be communicably coupled with some or all of the elements of the assembly 300, including the gear box 311, reversible electric motor 303, voltage regulators 306, 307, and 309, brake 315, clutch/torque limiter 314, etc. Line 350, for example, may provide a communication pathway from regulator 306 to the control electronics 308. In certain embodiments, line 350 may be used to monitor a current level of the reversible electric motor 303 and may carry a signal that is proportional to the instantaneous current being drawn by the motor 303. The control electronics 308 may be configured such that if after a delay of a preset time period the signal exceeds a preset current level threshold, the control electronics 308 transmits a signal to shut off power to the motor 303 using line 360 while simultaneously engaging the brake 315. The preset current level may be proportional to the maximum recommended drive current for the motor 303. Alternatively, the control electronics 308 could decouple the motor 303 from the gear box 311 by triggering clutch 314 using line 355 while simultaneously engaging the brake 315. By decoupling the motor 303 from the spring 310, it may be possible to use the motor 303 for other applications, such as active cooling, even after the spring 310 has been wound to its maximum tension.

The control electronics 308 may also continually monitor a voltage level of the reversible electric motor 303 using lines 365 and 370. The voltage level may correspond to the amount of power that is being provided to the motor 303 by the alternator 302. When the voltage drops below a predetermined threshold, it may indicate that the flow of drilling mud has stopped driving the alternator 302. The control electronics 308 transmit a signal to engage the brake 315 and control when to disengage the brake 315 to generate power for the downhole tools. For example, in certain embodiments, the control electronics 308 may trigger a timer that counts down when to disengage the brake 315 and start generating electrical power with the mechanical energy stored in the spring 310. After this time delay, the brake 315 may be released, causing the energy of the spring 315 to drive the reversible motor 303 and generate electricity. Additional timing operations could be carried out by the control electronics 308 so as to sequence and control several activities while flow is stopped in a way that makes efficient use of the stored energy.

The control electronics 308 may control power for downhole survey and measurement operations during times when the flow of drilling fluid has stopped. Certain formation survey operations may be most accurate when the drilling fluid is not flowing. These operations and similar operations may be planned for periods of time when the flow of drilling fluid has ceased. The control electronics 308 may determine the period of time during which the flow of drilling fluid has ceased and compare that to the time required to perform the planned survey operations. If the flow of drilling mud was interrupted for sufficient time that all of the planned survey operations have taken place, the control electronics 308 may go into a background task mode, operating timers related to long-term tasks that might need to be carried out if flow is not established after a long period of time. The control electronics 308 may alternately engage and disengage the brake 315 as needed to release power for these background tasks. If, on the other hand, the operations to be carried out while flow has ceased have not been completed, the operations may be terminated, and power from the alternator 302 may again be applied to the reversible motor 303.

In certain embodiments, the control electronics 308 may further carry out a number of "bookkeeping" operations while drilling mud is flowing and while the flow is terminated. For example, these operations may include recording in memory the time at which surveys were taken and other activities were carried out, and the times at which power derived from the flow of drilling fluid became available and when the power ceased. The control electronics 308 may further include flags that could be set for all scheduled activities as they were carried out to signify successful completion. In certain embodiments, the control electronics 308 may be coupled to memory within a MWD/LWD system and may record values within the MWD/LWD system that correspond to the above described bookkeeping operations.

The embodiment shown in FIG. 3 is not intended to be limiting and could be varied in numerous respects. For example, the alternator 302 could be used to derive several energy storage devices similar to spring 310. Likewise, the reversible electric motor 303 may be either direct current or alternating current. Additionally, the output of the turbine 301 could be coupled directly to gear box 311 and energy stored in spring 310 could then be used to drive alternator 302 when the turbine 301 is not rotating.

Figure 4A:
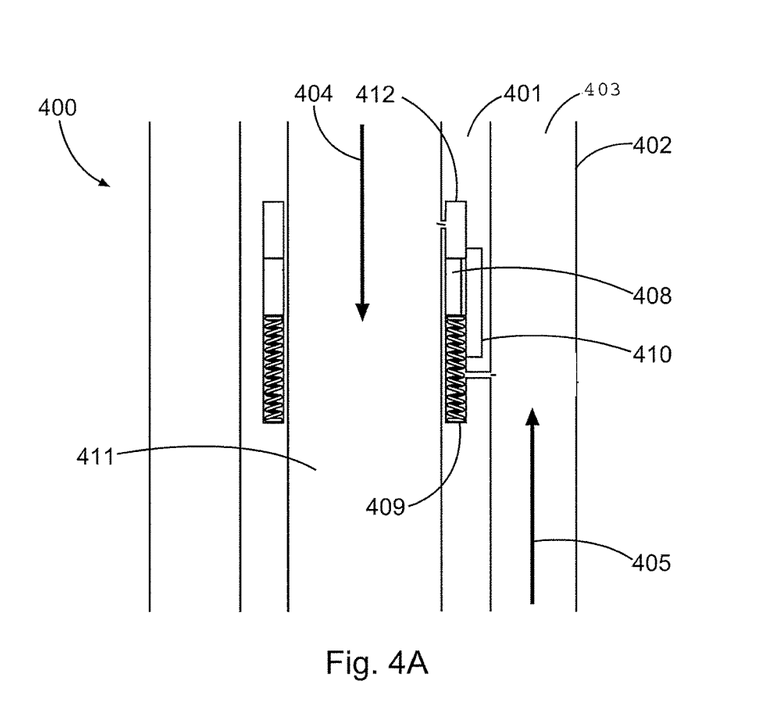
FIGS. 4A and 4B are diagrams illustrating an example power storage and conversion assembly, according to aspects of the present disclosure.
Figure 4B:
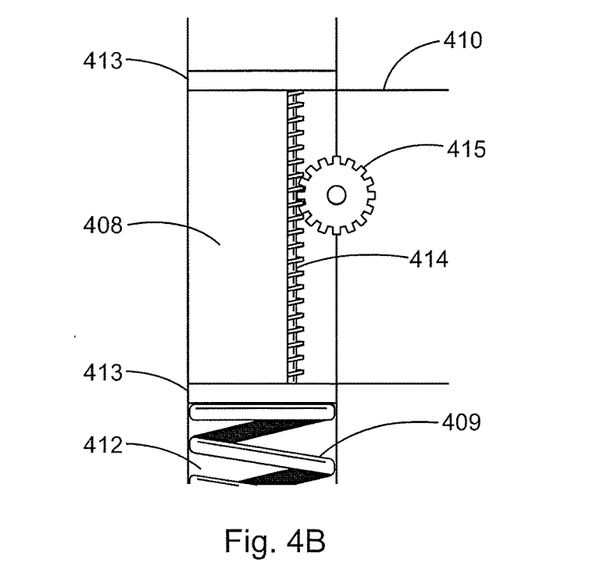

FIGS. 4A and 4B are diagrams illustrating an example power storage and conversion assembly 400, according to aspects of the present disclosure. The assembly 400 may comprise a biasing member 408 disposed within a chamber 412 in a downhole tubular 401, such as a drill collar. The chamber 412 may be in fluid communication with an internal bore 411 of the tubular 401 and with an annulus 403 between the tubular 401 and a borehole wall 402. During drilling operations, drilling fluid may travel downwards within the bore 411 and may return to the surface within annulus 403. The downward flow may be referred to as a string or bore flow and is illustrated with arrow 404. The upward flow may be referred to as an annulus flow and is illustrated with an arrow 405. The string flow 404 and the annulus flow 405 may create a differential pressure between the bore 401 and the annulus 403. This differential pressure may comprise a fluid energy that may be received at the biasing member 408. The fluid energy may be stored in an energy storage device 409 when the biasing member 408 moves in response to the differential pressure. In the embodiment shown, the energy storage device 409 may comprise a spring and the biasing member 408 may compress the spring in response to the differential pressure.

The biasing member 408 may comprise a ring or a block that is positioned proximate to a generator 410. The biasing member 408 may comprise seal assemblies 413 that seal against the wall of chamber 412. In the embodiment shown, the biasing member 408 is coupled to the generator 410 through a linear gear 414 disposed on a surface of the biasing member 408. The linear gear 414 may cooperate with the rotary gear 415 of the generator 415 to form a gear assembly. In other embodiments, the biasing member may be magnetically coupled to the generator 410 through at least one magnet disposed within or coupled to the biasing member 408. For example, the magnet may comprise a linear magnetic strip with alternating zones of magnetization, and may be magnetically coupled to a magnet attached to the shaft of the alternator such that the magnet causes the shaft to rotate in response to movement of the linear magnetic strip. Alternatively, the magnetic strip could move within a solenoid and induce voltage in the solenoid via a moving magnetic field.

When the flow of drilling fluid ceases, the differential pressure compressing the spring 409 may also cease, allowing the mechanical energy stored within the spring 409 to be released as the spring 409 expands within the chamber 412. As the spring 409 expands, the linear gear 414 may rotate the rotary gear 415, causing the generator 410 to generate electricity. In embodiments where the biasing member 408 is magnetically coupled to the generator 410, releasing the mechanical energy may cause a magnet within the biasing member 408 to move with respect to the generator 410, causing the generator 410 to generate electricity.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee. The indefinite articles "a" or "an," as used in the claims, are defined herein to mean one or more than one of the elements that it introduces.

What is claimed is:

1. An apparatus for downhole energy storage, conversion, and generation, comprising:
   an energy storage device;
   a power source that derives power from a flow of a drilling fluid during a drilling operation; and
   a reversible electric motor coupled to the energy storage device and the power source, wherein the reversible electric motor comprises a first mode in which it transmits energy from the power source to the energy storage device and a second mode in which it generates electricity with energy received from the energy storage device.

2. The apparatus of claim 1, wherein the power source comprises at least one of a fluid-driven power source and a vibration-driven power source.

3. The apparatus of claim 1, wherein the power source comprises one of a turbine coupled to an alternator, a generator comprising magnetostrictive elements, or a generator comprising piezoelectric elements.

4. The apparatus of claim 2, wherein the energy storage device comprises a spring.

5. The apparatus of claim 4, further comprising at least one gear assembly disposed between the reversible electric motor and the energy storage device.

6. The apparatus of claim 5, wherein the gear assembly comprises a brake mechanism.

7. The apparatus of claim 5, further comprising a torque limiter disposed between the reversible electric motor and the energy storage device.

8. The apparatus of claim 6, further comprising control electronics communicably coupled to the reversible electric motor, the gear assembly, and the torque limiter.

9. The apparatus of claim 8, wherein the control electronics comprise a processor and a memory device coupled to the processor that includes a set of instructions that when executed by the processor cause the processor to:
monitor a current level of the reversible electric motor;
transmit a first control signal to at least one of the gear assembly and the torque limiter if the current level exceeds a first threshold;
monitor a voltage level of the reversible electric motor; and
transmit a second control signal to at least one of the gear assembly and the torque limiter if the voltage level drops below a second threshold.

10. The apparatus of claim 9, wherein the set of instructions further cause the processor to record a status of at least one survey operation performed when the voltage level is below the second threshold.

11. A method for downhole energy storage, conversion, and generation, comprising:
receiving, at a fluid-driven power source, fluid energy from a flow of drilling fluid in a borehole;
storing the fluid energy as mechanical energy in an energy storage device in the borehole;
transmitting energy, by a reversible electric motor, from the fluid-driven power source to the energy source device when the reversible electric motor is in a first mode, wherein the reversible electric motor is coupled to the energy storage device and the fluid-driven power source; and
generating electricity with energy received from the energy storage device when the reversible electric motor is in a second mode.

12. The method of claim 11, wherein the fluid-driven power source comprises one of a turbine coupled to an alternator or a generator comprising magnetostrictive elements or piezoelectric elements.

13. The method of claim 12, wherein
the energy storage device comprises a spring;
the reversible electric motor is coupled to the spring and the fluid-driven power source; and
storing the fluid energy as mechanical energy in the spring comprises winding the spring using the reversible electric motor in response to power received at the reversible electric motor from the fluid-driven power source.

14. The method of claim 11, wherein
the energy storage device comprises a spring; and
storing the fluid energy as mechanical energy comprises compressing the spring with a biasing member.

* * * * *